Feb. 28, 1967    B. D. STEDMAN ET AL    3,307,178
SIGNAL STORAGE SYSTEM FOR A RADAR SYSTEM
Filed June 10, 1966    4 Sheets-Sheet 2

INVENTORS
BRIAN D. STEDMAN
WILLIAM C. BROWN
BY ERIC F. V. ROBINSON

Cushman Darby & Cushman
ATTORNEYS

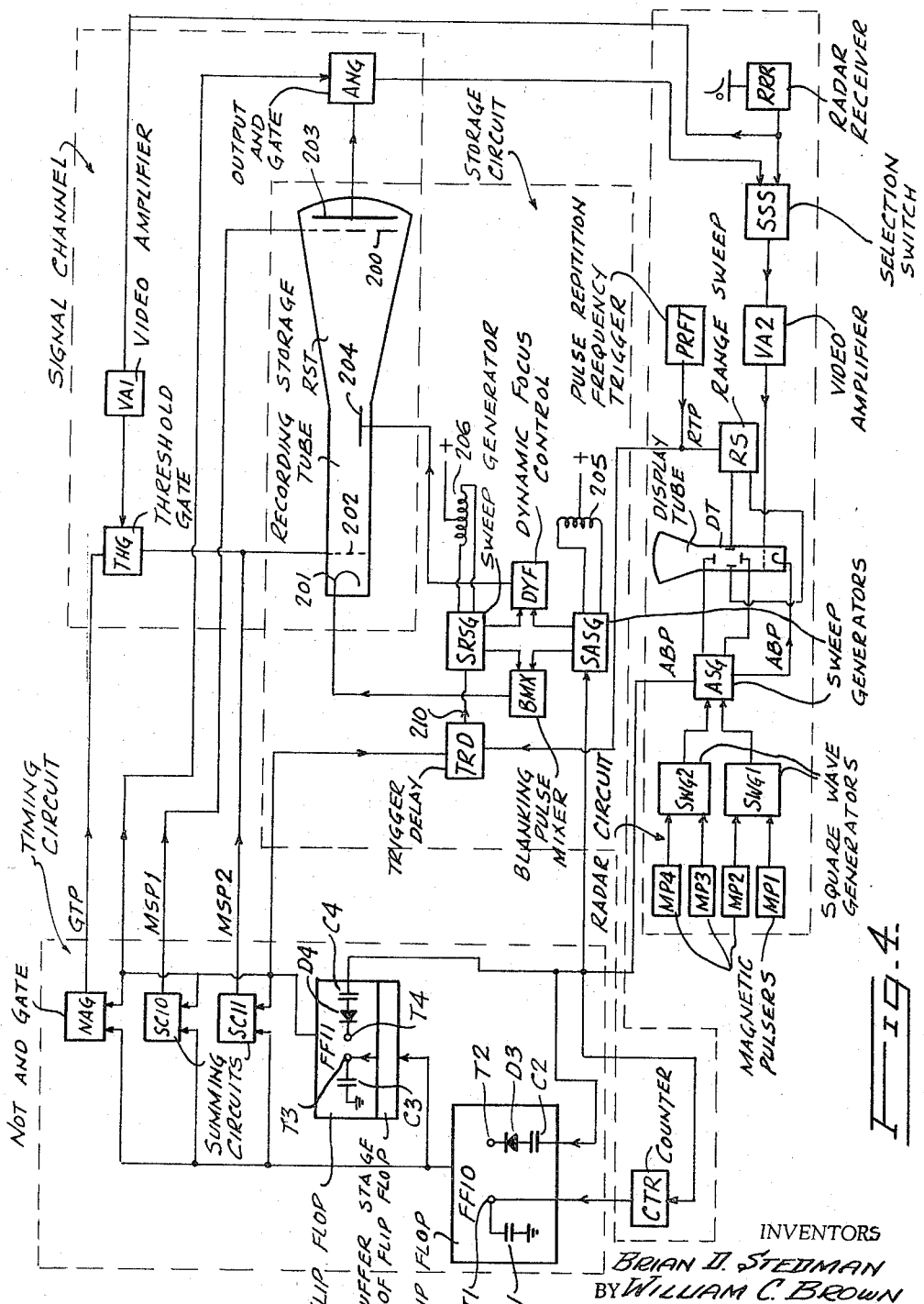

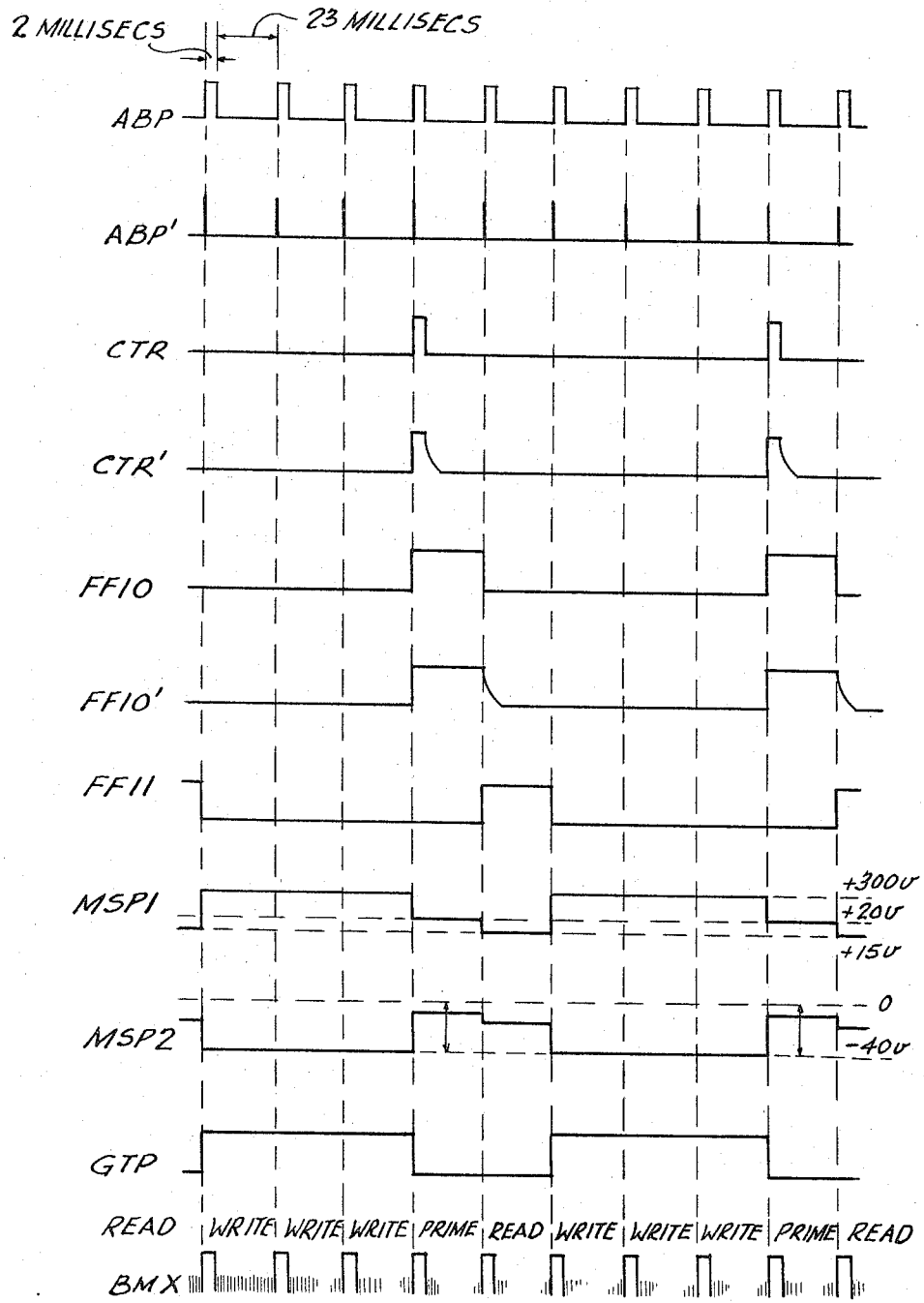

United States Patent Office 3,307,178
Patented Feb. 28, 1967

3,307,178
SIGNAL STORAGE SYSTEM FOR A RADAR SYSTEM
Brian D. Stedman, William C. Brown, and Eric F. V. Robinson, all of Ottawa, Ontario, Canada, assignors to Canadian Patents and Development Limited, Ottawa, Ontario, Canada, a corporation of Canada
Filed June 10, 1966, Ser. No. 557,860
Claims priority, application Canada, July 30, 1963, 881,376
6 Claims. (Cl. 343—5)

This application is a continuation-in-part of application Serial No. 365,941, filed May 8, 1964, now abandoned.

This invention relates to improvements in a radar system for use in locating enemy weapons by obtaining echoes from the projectiles fired by such weapons.

The invention is concerned with a radar system which operates by determining at least two points through which a projectile passes, the system including a computer for determining from two of such determined points the point of intersection of the trajectory of the projectile with a working plane. The system is of particular utility when the weapon itself is hidden from direct visual or radar observation.

The system is also useful for watching friendly projectiles aimed at an enemy weapon. In ths case it determines the point of impact or burst of a friendly projectile by making the same extrapolation for the trajectory of a falling projectile as for a rising projectile. The point to be located through which the trajectory extends (whether for a rising or falling projectile) is called the target point. In the general case, the target point is the point of intersection of the projectile trajectory with a selected plane referred to as the "working plane," the working plane being defined as the plane including the line between the radar system and the target point and all horizontal lines perpendicular to said line. The angle of the working plane will generally be chosen to give a ground location for the target point, but this is not necessarily so, especially when observing a friendly projectile which has been fused for air burst.

Such a system is described in W. C. Brown et al., U.S. Patent No. 3,182,319 issued May 4, 1965. This patent describes a system the antenna of which provides a narrow beam substantially circular in cross-section having a width of approximately 16 mils (approximately 1°, a mil being 360°/6400) in both directions. The system causes this narrow beam to scan horizontally through approximately 400 mils (22.5°) alternately in two planes separated in angle by approximately 40 mils (2.25°) at beam centers. This action defines, by the narrow beam locus, two vertically superposed, generally horizontal, fan-shaped beams, each scanned 20 times per second, hereinafter referred to as the upper and lower beams.

Echoes (intercepts) returned in each of the upper and lower beams when a projectile passes through it, are displayed on a range-azimuth radar display in two series (one for each of said beams). The duty of the operator is to observe or mark the center points of the leading edges of the first and last echoes received in each of the upper and lower beams and to estimate and mark the mean points between each pair of these two extreme center points. The radar screen is provided with an outer surface that can readily be marked by the operator using a suitable stylus. Having marked the mean center points on the screen, the operator then feeds information concerning the positions of these points into a computer which calculates an extrapolated target point on the working plane through which the projectile trajectory passes. The computer displays the position of this target point in counters as representing the position of the weapon or point of impact or burst of a friendly projectile. During the course of this operation, the operator normally also determines $\Delta T$, the time between the projectile being in similar positions in each of the upper and lower beams. Such smilar positions can conveniently be the moments when the projectile enters each of said beams.

As above mentioned, the system may be used for observing rising projectiles (normally enemy) or falling projectiles (normally friendly). In a modification to the basic system described in Clemence et al., U.S. Patent No. 3,182,317 issued May 4, 1965, a method is disclosed of observing both rising and falling projectile during the same period of operation, means being provided to indicate in the radar system the differences between the co-ordinates of the various target points computed. These differences are then conveyed to the friendly gunners to enable them to correct their fire to direct it more accurately on to the enemy weapons.

More than one enemy weapon may be involved and the radar system may be called upon to assist the direction of fire of more than one friendly gun. As a result, the operator may be called up to compute target points corresponding to two or more projectiles which are in the air simultaneously. A skilled operator may to some extent be able to mark on the screen the center points of echo groups received from more than one projectile simultaneously, for separate feeding into the computer at a later time. There will tend to be a loss of accuracy, if the operator attempts to mark the center points for more than one projectile simultaneously, and there will come a stage when the density of projectiles becomes too great for even a highly skilled operator to observe and record the echo groups properly.

The present invention is concerned with further improvements in a radar system of the general type referred to above, in which provision is made for the continuous storing and retrieval of echoes previously received in order that they may be displayed for sufficient time to enable the operator to extract relevant coordinates with the electronic marker, as opposed to stylus marking, or, in cases of exreme activity, to provide him with sufficient background material to enable him to close the display against current data and concentrate his energies entirely upon past data.

One manner of carrying the present invention into practice is illustrated diagrammatically in the accompanying drawings. The specific system illustrated is provided by way of example, the broad scope of the invention being limited only by the appended claims. In these drawings:

FIGURE 4 is a circuit diagram of a portion of the receiving circuit of the radar system incorporating a storage and associated circuits in accordance with the present invention;

FIGURES 5 and 6 are time-sequence diagrams; and

*Overall system (FIGURE 1)*

Figure 1:
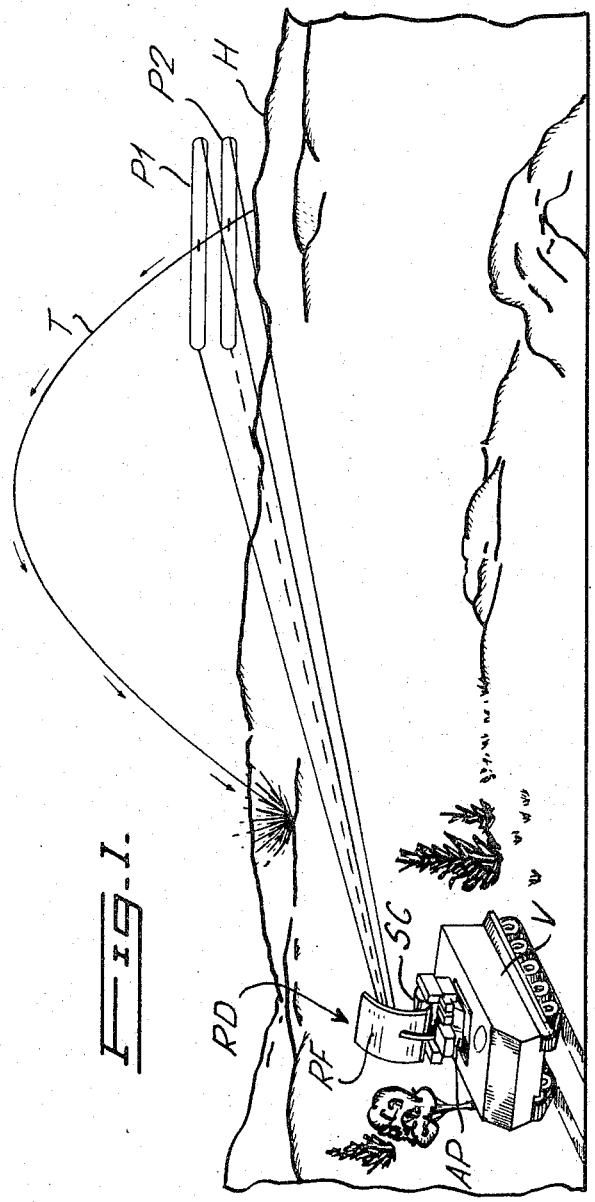
FIGURE 1 is a general perspective view of a radar system in operation.

FIGURE 1 shows the radar system RD mounted on a vehicle V being used to observe the trajectory T of a projectile fired by a mortar positioned out of direct visual or radar range behind hills H. The antenna system of the radar system RD provides a narrow beam substantially circular in cross-section having a width of approximately 16 mils (approximately 1°) in both directions. The system causes this narrow beam to scan horizontally through approximately 400 mils ( 22.5°) alternately in two planes P1 and P2 separated in angle by approximately 40 mils (2.25°) at beam centers. This action defines, by the narrow beam locus, two vertically superposed, generally horizontal fan-shaped beams, each scanned 20 times per second, hereinafter referred to as the upper and lower beams. This effect is achieved by use of a Foster type scanner SC similar to that disclosed in Foster U.S. Patent No. 2,832,936 issued April 29, 1958, and modified to provide a dual beam in a manner similar to that described in "Mobile Radar Pinpoints Enemy Mortar Positions," by M. S. Jaffee et al., "Electronics," September 18, 1959, page 34 et seq. The scanner SC is placed at the focus of a semi-parabolic cylinder RF which reflects two focused beams. The scanner SC and reflector RF are mounted as an assembly on an antenna platform AP on the vehicle V, which platform is maintained horizontal at all times (see C. R. Clemence et al. U.S. patent application No. 269,383 filed April 1, 1963, now abandoned). The scanner-reflector assembly can be inclined relative to this horizontal platform AP to alter the angle of the beams as a pair while maintaining constant their angular separation. The limits of this adjustment may for practical purposes be set at 212 mils (12°) above the horizontal to 106 mils (6°) below the horizontal, these angles being between the horizontal and the center of the lower beam plane P2. The antenna assembly can be rotated to provide complete coverage through 6400 mils (360°) in azimuth.

*Echo display (FIGURE 2)*

As a projectile enters the field of scan of the lower beam, an echo E1 is displayed on the screen S by a group of individual signal returns resulting from a single passage of the narrow beam across the projectile. The center of the leading (lower) edge of this echo represents the true position of the object (projectile) being observed. As the beam continues to sweep, a series of such echoes appears on the screen S. This series of individual echoes makes up the composite echo E of FIGURE 2. In reality there may be many more than the five individual echoes shown. Some fading of the earlier echoes will have taken place by the time the last echo appears, but they are all shown simultaneously and enlarged from their true size in FIGURE 2 for ease of illustration. The duty of the operator is to observe or mark the center points of the leading edges of the first and last echoes and to estimate the mean point between these two extreme center points. The screen S is provided with an outer surface that can readily be marked by the operator using a suitable stylus. This is the normal method of operation which can be improved upon by the present invention, as described below.

Figure 2:
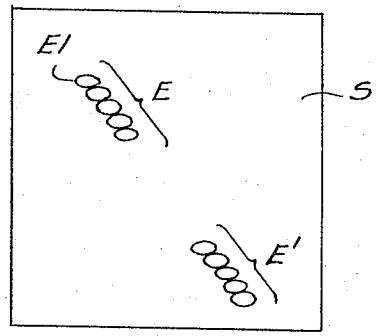
FIGURE 2 is an illustration of typical series of echoes displayed on the radar screen.

Assuming that an enemy weapon is firing from left to right and towards the radar system RD, a further series of echoes is detected a few moments later by the upper beam, being shown as composite echo E' in FIGURE 2. The echoes of this second series will similarly have leading edge center points, the mean point of which is determined and marked on the screen by the operator. The upper beam echoes will appear in a lower position on the screen S than the lower beam echoes when the weapon is firing towards the radar system, since the range will have shortened somewhat by the time the projectile reaches the upper beam. If the weapon is firing away from the radar system, the upper beam echoes will appear above the lower beam. Since the upper beam echoes appear first for a falling projectile and second for a rising projectile, the operator is unable to be sure from this display which echo series (and hence which marked center point) corresponds to which beam. It is necessary, however, for him to have this knowledge in order for him properly to feed into the computer the information he has obtained.

For feeding the computer, the screen S is provided with a marker spot, which is an electronic marker produced by conventional circuitry in the radar transmitter-receiver combination and synchronized with the scope sweep so as to occupy a single desired position on the screen S determined horizontally by an azimuth marker handwheel and vertically by a ranger marker handwheel. The operator first moves the marker spot to coincide with the mean point of the lower beam and when he has achieved this coincidence he presses a foot switch to actuate the computer. After closing this switch the operator moves the marker spot to the mean point of the upper beam. In this way the operator feeds into the computer the difference in range and the difference in azimuth between these two means points. It is essential, however, that the operator move the marker spot from the lower beam point to the upper beam point, and not vice versa; hence the need to know which is the lower beam echo series. In this connection means for positively identifying the echoes returned in a selected one of the beams is described in A. Hendry et al. U.S. Patent No. 3,182,309, issued May 4, 1965. No further consideration need be given in the present application to the identification signals employed, beyond stating that they may be injected into the stored display of the present improvement in the same way as they are injected into the visual display in such last-mentioned application.

*Azimuth scanning (FIGURE 3)*

Figure 3:
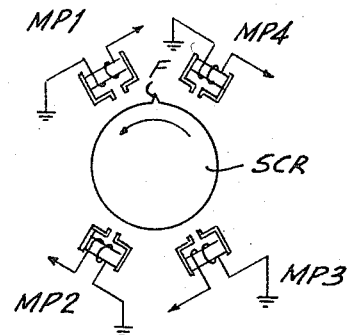
FIGURE 3 is a diagrammatic illustration of a fragment of the antenna assembly of the radar system.

FIGURE 3 shows the antenna scanner rotor SCR which is fitted with a peripherally projecting finger F which, during each rotation of the scanner (1/20 of a second), sequentially actuates magnetic pulsers MP1, MP2, MP3 and MP4, which gate a pair of square wave generators SWG1 and SWG2 (FIGURE 4) in the following sequence: to start the lower beam (pulser MP1); to stop the lower beam (pulser MP2); to start the upper beam (pulser MP3); and finally to stop the upper beam (pulser MP4). Square wave generator SWG1 sends a lower-beam gating pulse to an azimuth sweep generator ASG which emits a conventional saw-tooth, lower-beam, azimuth sweep signal. Similarly, the square wave generator SWG2 sends an upper-beam gating pulse to the sweep generator ASG to cause it to emit a saw-tooth, upper-beam, azimuth sweep signal. The combination of these azimuth sweep signals consists of a 40 cycle saw-tooth wave which is applied to the visual display tube DT. A range sweep RS comprises a conventional sweep circuit to form lines at approximately 8,000 cycles per second.

*Recording storage tube (FIGURE 4)*

The recording storage tube RST is a commercially available storage or "memory" tube. Its manner of operation is known, and will thus not be explained in full detail in this specification. Sufficient general comment on its operation will, however, be made to render clear the manner in which the pulses applied to the tube by the circuit of FIGURE 4 achieve the desired results.

A metallic (for example, nickel) mesh screen of very fine structure (for example, 1000 lines per inch) is formed. A dielectric material of extremely high resistivity ($10^{12}$ to $10^{14}$ ohms, for example, calcium fluoride) is then deposited on one face of the metallic screen by evaporation in a vacuum, and a coating of gold is evaporated onto the other face of the screen in ohmic contact with the nickel and covering the dielectric material on all sides except the face to be scanned by the electron beam. This composite screen 200 is mounted in the tube with the dielectric material facing the electron gun, with the supporting metallic substrate constituting an electrode whose potential establishes a reference voltage for the dielectric surface.

Charge on the dielectric material is established and altered by electrons that strike it, and such action varies according to modes of operation constituting one operating cycle. First, to erase information previously stored, the dielectric surface is made negative with respect to its substrate by scanning with low-energy electrons. This is called the PRIME scan, since it prepares the surface for subsequent writing of data. By adjustment of the prime current, partial erasure can be achieved, and the tube is used in this way in the circuit to provide variable persistence. In the PRIME mode, the potential of the storage screen is set at a voltage determined by the tube characteristics, of the order of +20 volts relative to the cathode 201. This voltage is less than the critical voltage of the dielectric material, which means that the ratio of the number of secondary electrons emitted to the number of incident primary electrons is less than 1. Thus the dielectric surface absorbs electrons until the potential of its surface becomes that of the cathode 201, namely 20 volts more negative than its substrate. During the priming scan the cathode current is variable between 0 and 150μa., the highest value veing used for full erase and the zero value for hold, the intermediate values being switch selected for variable persistence. When it is desired to retain stored data with minimum decay, the hold mode is employed. In the hold mode no additional data are inserted. The beam is not modulated by the control grid 202 in the electron gun during the priming scan.

After the dielectric surface is thus primed to a potential about 20 volts more negative than its supporting substrate, the WRITE scan may begin. To write, the potential of the storage screen is raised to +300 volts and the electron beam is intensity modulated by the signal to be recorded. Now electrons arrive at the dielectric surface with sufficient energy for the ratio of the number of secondary electrons to the number of primary electrons to become greater than 1. Hence, in a pattern governed by the modulation and sweep of the beam, electrons in varying number are removed from discrete areas of the scanned dielectric so that the potential of each such area is made to approach that of the substrate. This operation raises the potential of the dielectric about 5 volts in such areas. A succession of WRITE scans may be used.

A READ scan can be interposed anywhere in the cycle, and it is convenient to insert a READ scan between the PRIME and WRITE scans. In the READ mode the voltage of the substrate is reduced to about +15 volts. This voltage (relative to cathode) is less than that for the PRIME mode by the amount of maximum change in charge introduced by the WRITE scan or scans. In other words, all parts of the dielectric are made negative with respect to the cathode, and some are more negative than others, accordng to the pattern of modulation during the WRITE mode. Thus no appreciable number of electrons in the beam will now strike the dielectric and the READ beam does not materially erase or alter the pattern or charge. Consequently there may be a large number of READ scans.

Although substantially no electrons of the readout beam strike the dielectric, the flow of electrons through the storage screen to a collector 203 is affected by the pattern of charge as the beam scans the screen. At the more negative areas fewer electrons can pass the electrostatic field and reach the collector. Hence the storage screen modulates the readout beam as does the signal grid in an amplifier tube. The collector 203 is a simple metallic electrode, the signals it receives being modulated with respect to time. These signals can then be reconverted into a two dimensional physical display by sweeps synchronized with the sweeps of the storage tube RST. The tube RST also includes conventional focussing electrodes shown diagrammatically at 204.

*Recording storage tube sweep circuits (FIGURE 4)*

The radar azimuth sweep generator ASG generates blanking pulses ABP between sweeps, which blanking pulses are used to bias off the beam in the visual display tube DT during the fly-back period. These azimuth blanking pulses ABP (shown in FIGURE 5) can typically have a duration of 2 millisecs. with a spacing of 23 millisecs., to yield a frequency of 40 per second. They are also fed to a storage azimuth-sweep generator SASG which generates a current saw-tooth wave for an aximuth coil 205 of a conventional magnetic deflection yoke of the recording storage tube RST.

A radar pulse repetition frequency trigger PRFT in the radar system generates range sweep trigger pulses RTP (FIGURE 6) which trigger the radar range sweep RS and are passed to a trigger delay TRD, the exact function of which will be described below. Suffice to say at this point that it energizes a storage range-sweep generator SRSG which generates a saw tooth waveform for a range coil 206 of the magnetic deflection yoke of the recording storage tube RST. The storage range and azimuth sweep generators SRSG and SASG control a dynamic focus control DYF, and their blanking pulses are combined in blanking pulse mixer BMX to produce the composite blanking waveform shown in FIGURE 5, which is applied to the cathode 201.

*Echo storage (FIGURES 4 to 7)*

The azimuth blanking pulses ABP are fed from the azimuth sweep generator ASG to a counter CTR which is set to count these pulses and emit an output pulse on receipt of every fifth input pulse (FIGURE 5). The output from counter CTR forms one input at terminal T1 of a flip-flop FF10, the other input terminal T2 of which receives the azimuth blanking pulses ABP. A capacitor C1 between terminal T1 and ground has the effect of storing some of the energy of each counter pulse CTR, so that the input pulse seen by the flip-flop FF10 at its terminal T1 is as shown in FIGURE 5 as CTR'. A capacitor C2 and diode D3 are arranged in series with the other input to the flip-flop FF10. The capacitor C2 has the effect of differentiating the blanking pulses ABP, and the diode D2 blocks passage of the negative portion of the differentiated pulse, so that the input pulse seen by the flip-flop FF10 at its terminal T2 is as shown in FIGURE 5 as ABP'.

The effect of this arrangement, which is conventional, is that the flip-flop FF10 is set to a first state by a pulse CTR' (which is much longer in duration and hence overrides the simultaneously received pulse ABP'). The flip-flop FF10 is reset by the next pulse ABP' (which is unaccompanied by a pulse CTR'), and hence the output from the flip-flop FF10 is as indicated at FF10 in FIGURE 5.

This output is fed to an input terminal T3 of a further flip-flop FF11, through a conventional buffer stage which merely serves to prevent the flip-flop FF11 reacting back on the flip-flop FF10. Terminal T3 has a capacitor C3 connected to ground which has the effect of lengthening the pulses FF10, so that the flip-flop FF11 sees them in the form shown as FF10' in FIGURE 5. The other input terminal T4 of flip-flop FF11 has a series connection of capacitor C4 and diode D4, so that this terminal sees pulses ABP', similarly to terminal T2 of the first flip-flop.

The flip-flop FF11 is triggered by the trailing edge of a pulse FF10' (the duration of which exceeds that of ABP') to be set to one state. It is then reset by the next pulse ABP' to form the pulses shown in FIGURE 5 as FF11.

Outputs FF10 and FF11 are summed in summing circuits SC10 and SC11. These circuits sum the outputs at different voltage levels to produce the mode switching pulses MSP1 and MSP2 shown in FIGURE 5. The summing circuit SC10 is an inverting summing amplifier of a type well known to the art which serves to add together preselected portions of flip-flop outputs FF10 and FF11 and to invert their polarity. The summing circuit SC11 is a summing amplifier of a similar type except that (a) the preselected portion of FF11 is different; (b) the output is not inverted; and (c) an external control is provided for varying the proportion of FF10 in MSP2. The various voltage levels shown being related to the cathode potential of the recording storage tube RST and the vertical arrow on the waveform MSP2 indicating that this portion may be varied up and down in voltage within limits by a persistence control in the summing circuit SC11.

The outputs FF10 and FF11 also pass to a NOT AND gate NAG whose output GTP includes the three WRITE scans shown in FIGURE 5. The two time intervals during which the output GTP is off are PRIME and READ respectively. Output GTP when on opens a threshold and gate THG to pass a video signal to the grid 202 of the recording storage tube RST during the WRITE periods. The threshold operation of gate THG eliminates noise below a certain level in the video signal which is received via a video amplifier VA1 from the radar receiver RRR.

Figure 6:
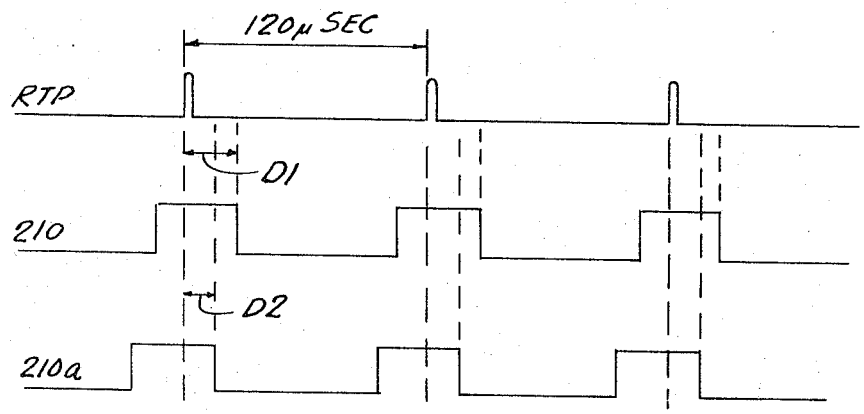

The function of the trigger delay TRD is to produce the waveform 210 (FIGURE 6) triggered by and delayed with respect to the range trigger pulse RTP. When energized by flip-flop output FF11, which is only during the READ period, this delay is reduced as shown by waveform 210a, so as effectively to advance in time the output signals from the collector 203. The trigger delay TRD includes a well-known phantastron circuit whose standing plate voltage is reduced, only during the READ cycle, by the inverted form of flip-flop output FF11. Since the delay produced by the phantastron is linearly related to its voltage excursion, the delay is thus reduced. The delay in the waveform 210 is shown in FIGURE 6 at D1; the reduced delay is shown in waveform 210a as delay D2. This reduction in the delay is necessary during the READ scan to compensate for signal delays in the signal path.

Signals from the collector 203 pass to an AND gate ANG which is opened only during the READ scan by a pulse FF11. By selection switch SSS the operator can select either the stored data from gate ANG, or the direct data from radar receiver RRR, or both. Video signals then pass through amplifier VA2 to the grid of display tube DT.

*Summary of sequence of operations (FIGURES 4 and 5)*

Assuming the recording storage tube RST to have previously been primed, a cycle can be considered as beginning with the three WRITE scans. At this time output GTP is on, so that the video signals reach grid 202. Also applied to this grid is the mode switching pulse MSP2 which at this time is −40 volts with respect to the cathode 201. This is slightly in excess of the cut-off bias so that passage of the electron beam only results from positive video signals. Mode switching pulse MSP1 of +300 volts is applied to the screen 200, a necessary condition for storage.

With data thus stored, a PRIME scan follows. The purpose of this scan is to effect a controlled amount of decay (or partial erase) of the stored information. Incoming video signals are cut off at gate THG; the potential of screen 200 is dropped to +20 volts; and a small negative voltage is applied to the grid 202 by mode switching pulse MSP2. The potential of the latter pulse (typically a few volts negative) determines the cathode current and hence the degree of erasure.

There follows a READ scan with incoming video signals still cut off; output gate ANG opened by the pulse from flip-flop FF11; and the voltage on the screen 200 reduced to +15 volts by the mode switching pulse MSP1.

*Range covered by recording storage tube (FIGURE 7)*

Figure 7:
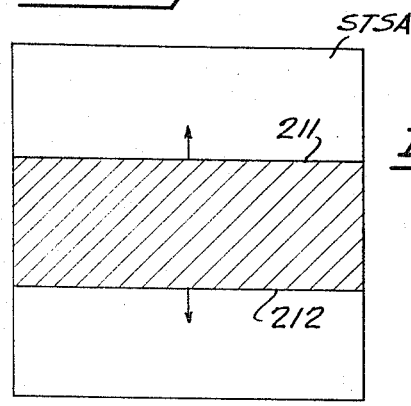
FIGURE 7 is a diagram representing the storage area of a recording storage tube.

Conveniently the full range sweep of the radar system will be applied to the storage tube RST, the storage area of which is represented by the rectangle STSA in FIGURE 7. Thus the vertical dimension may represent a 20 kilometer range, or 14 kilometers when operating on short range. The horizontal dimension represents the azimuth sweep. The operator will, however, be interested in only a portion of the range sweep, depending upon the area of military activity, and to improve the definition of the display obtained over the area of interest he will be able to select an area such as that between the lines 211 and 212 and pass such area to the display tube DT. This result is achieved by variation of the timing between the display tube range sweep RS and the storage tube range sweep generator SRSG. Such control is incorporated in the range sweep RS and varies its timing in relation to the pulse repetition frequency trigger PRFT. For this purpose the range-sweep RS contains well known circuits for controlling the start and extent of the displayed range on the display tube DT relative to the initiating trigger pulse RTP and hence relative to the storage range-sweep generator SRSG. A circuit for achieving this effect is disclosed in Eric F. V. Robinson's Canadian Patent No. 580,247 issued July 28, 1959.

*Summary of circuits (FIGURE 4)*

The system shown in FIGURE 4 can for convenience be considered as consisting essentially of four circuits:

A. The radar circuit: consisting of the radar receiver RRR, display tube and associated sweep circuits.
B. The storage circuit: consisting of the storage tube and its sweep, focussing and blanking circuits.
C. The signal channel of which the storage tube also forms a part, together with the input and output gates THG and ANG.
D. The timing circuit: consisting of the flip-flops, summing circuits and gate NAG which together supply the necessary gating pulses for use in the storage circuit and signal channel.

*Operator's improved procedure*

The standard manner of employing the radar system (without storage) has been described above. While the storage facility of the present invention still permits such standard procedure to be employed and with increased accuracy, especially under conditions of intense activity, it also enables an improved procedure to be adopted. Such improved procedure consists of elimination of the need to mark the display tube with a stylus and to estimate the mean points hurriedly. The ability to retrieve relevant information repeatedly enables the operator to take a more leisurely and therefore more accurate approach to estimation of the mean points, and further enables him to use the electronic marker to extract the position coordinates directly from the tube display without a need for the intermediate step of stylus marking.

*Form of display device*

Instead of supplying the radar information (echo signals) to the conventional display tube DT as illustrated, this information may be displayed in any form of area display device, or may provide the input to an automatic data processing device in an automated radar system.

We claim:
1. For use in a radar system having
  (a) means for receiving data signals,
  (b) a display device for displaying said data signals,
  (c) and means for generating time reference signals for said display device;
a storage system comprising
  (d) a recording storage tube,
  (e) means for applying the received data signals to said storage tube during a WRITE mode thereof,
  (f) means for retrieving stored signals from said storage tube during a READ mode thereof,
  (g) means for applying said retrieved signals to the display device,
  (h) means for generating sweep signals for said storage tube,
  (i) said means for generating sweep signals being connected to said means for generating time reference signals for substantially synchronising the sweep signal of the tube with the time reference signals of the device,
  (j) timing means for sequentially energising said storage tube in WRITE and READ modes,

(k) wherein said storage tube has a PRIME mode separate from said READ mode, during which PRIME mode a degree of decay of stored signals is produced, (l) and means for varying the degree of decay of stored signals during said PRIME mode.

2. The system of claim 1, wherein said timing means is constructed for energising said storage tube in each of said WRITE, READ and PRIME modes.

3. The system of claim 2, wherein said timing means is constructed for energising said storage tube with a plurality of successive scans in WRITE mode, and subsequently energising said storage tube with at least one scan in PRIME mode and at least one scan in READ mode.

4. The system of claim 1, wherein said display device is a display tube and the time reference signals therefor comprise sweep signals.

5. A radar system comprising
 (a) a radar circuit including
  (i) means for receiving data signals,
  (ii) a display device for displaying said received data signals,
  (iii) and means for generating time reference signals for said display device,
 (b) a storage circuit including
  (iv) a recording storage tube having WRITE, READ and PRIME modes, in the latter of which a predetermined degree of decay of stored signals is produced,
  (v) means for generating time reference signals for said storage tube,
  (vi) and means interconnecting means (iii) and (v) for substantially synchronising the time reference signals of the display device and the storage tube,
 (c) a signal channel including
  (vii) gate means for applying said received data signals to said storage tube,
  (viii) gate means for retrieving stored signals from said storage tube,
  (ix) and means for applying said retrieved signals to said display device,
 (d) and a timing circuit including
  (x) timing means triggered by one of said time reference signals for energising said storage tube for at least one scan in each of its WRITE, PRIME and READ modes,
  (xi) said timing means being connected to said gate means for opening said gate means (vii) during a scan in WRITE mode and for opening said gate means (viii) during a scan in READ mode.

6. A radar system according to claim 5, wherein said display device is a display tube and the time reference signals for said display tube and the storage tube are sweep signals synchronised with each other.

No references cited.

RODNEY D. BENNETT, *Primary Examiner.*

T. H. TUBBESING, *Assistant Examiner.*